May 16, 1950 A. BRAUNWORTH 2,507,850
ADJUSTABLE BEARING SUPPORT
Filed Oct. 20, 1948 7 Sheets-Sheet 1
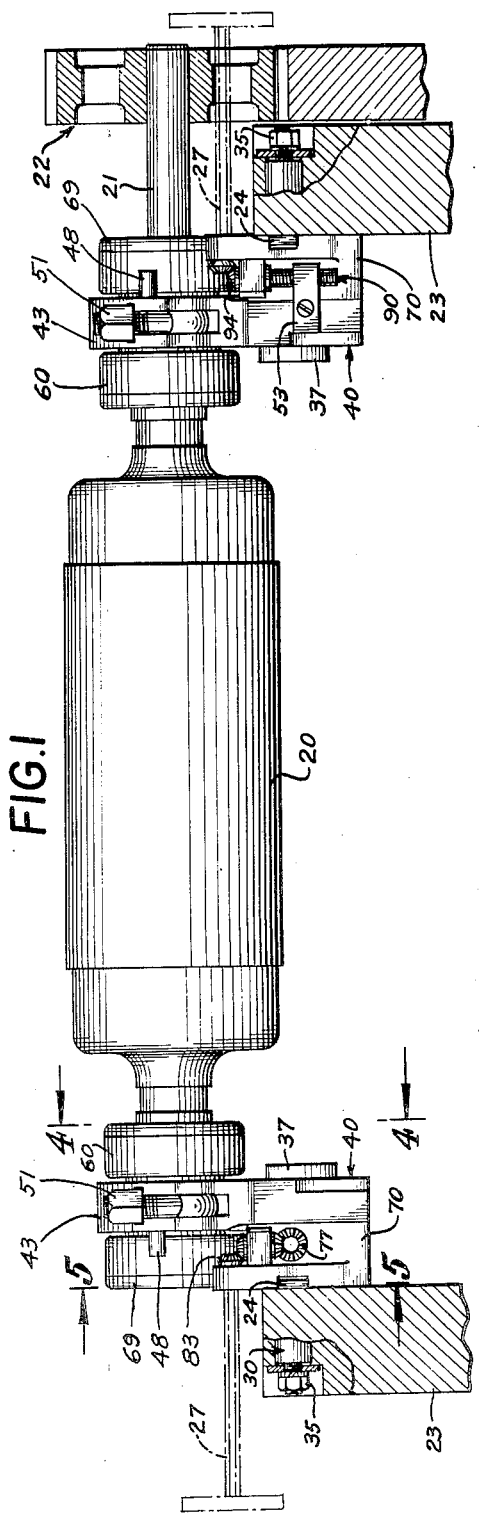
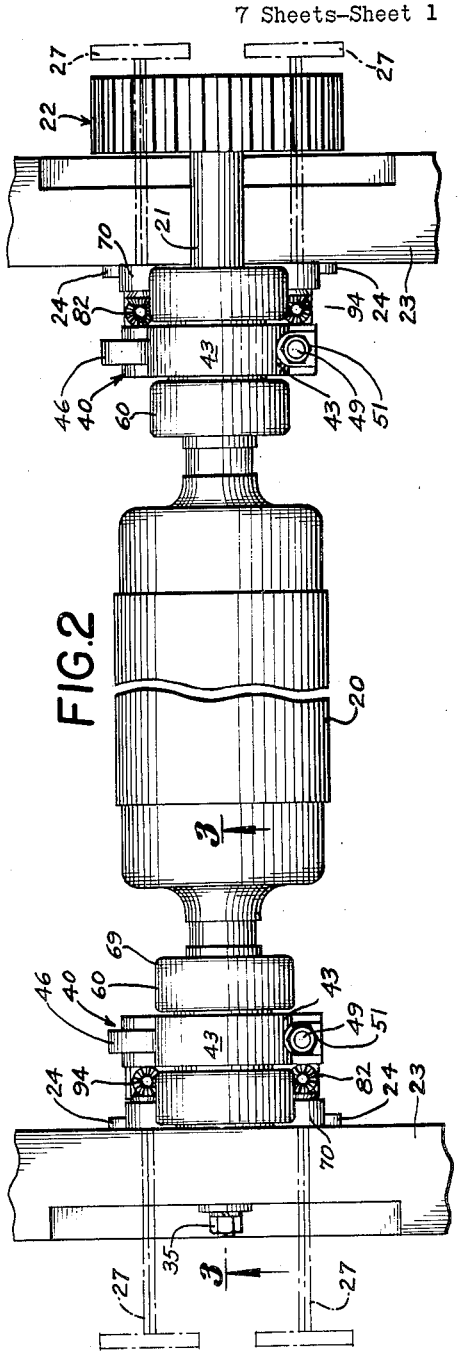
INVENTOR.
ALBERT BRAUNWORTH
BY
Campbell, Brumbaugh & Free
ATTORNEYS

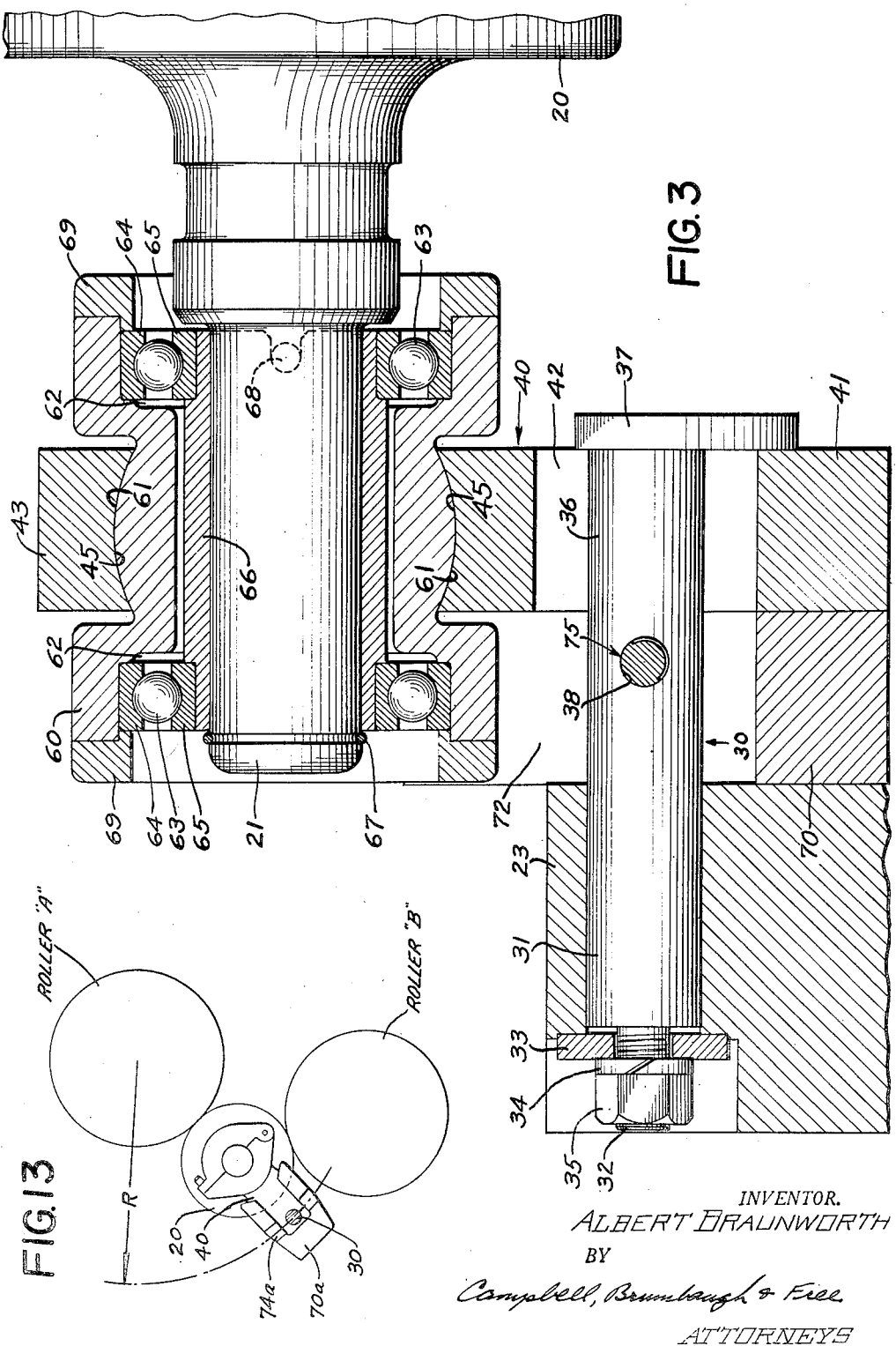

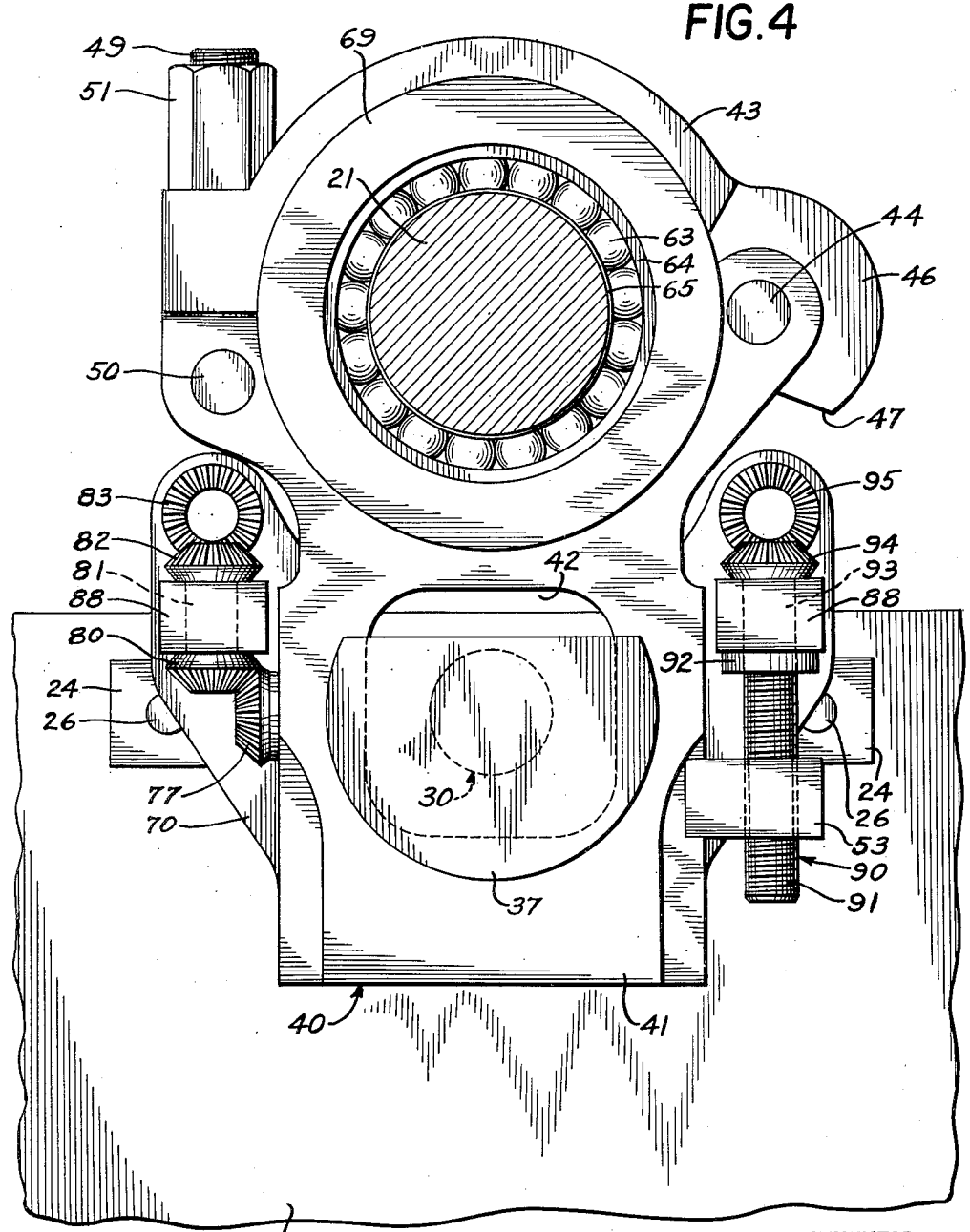

May 16, 1950 — A. BRAUNWORTH — 2,507,850
ADJUSTABLE BEARING SUPPORT
Filed Oct. 20, 1948 — 7 Sheets-Sheet 4

INVENTOR.
ALBERT BRAUNWORTH
BY
Campbell, Brumbaugh & Free
ATTORNEYS

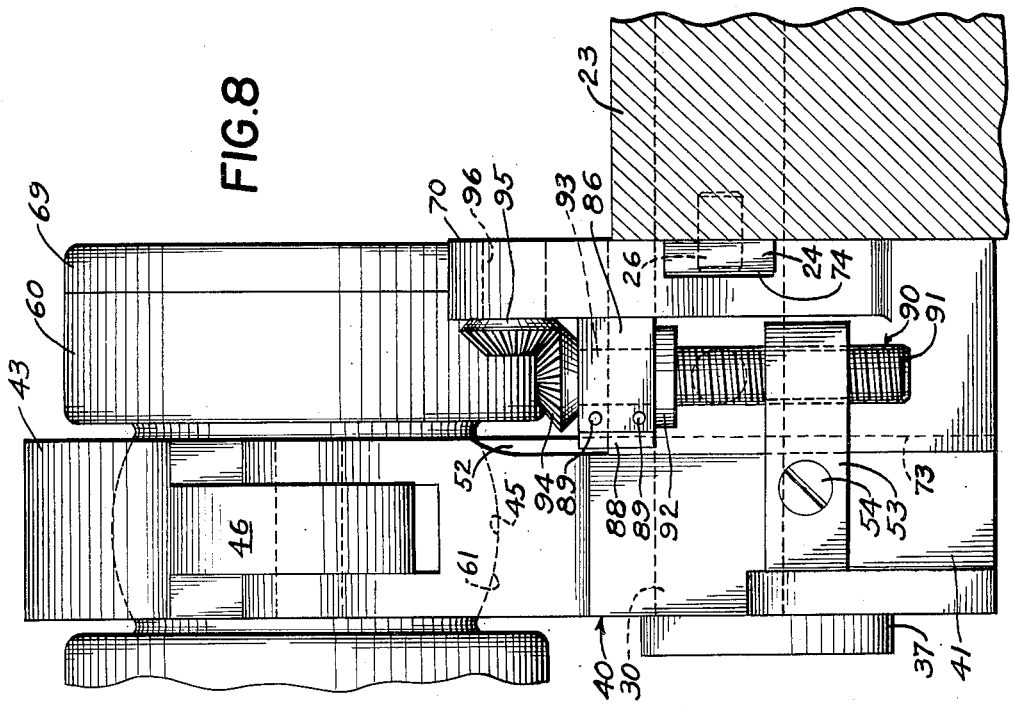
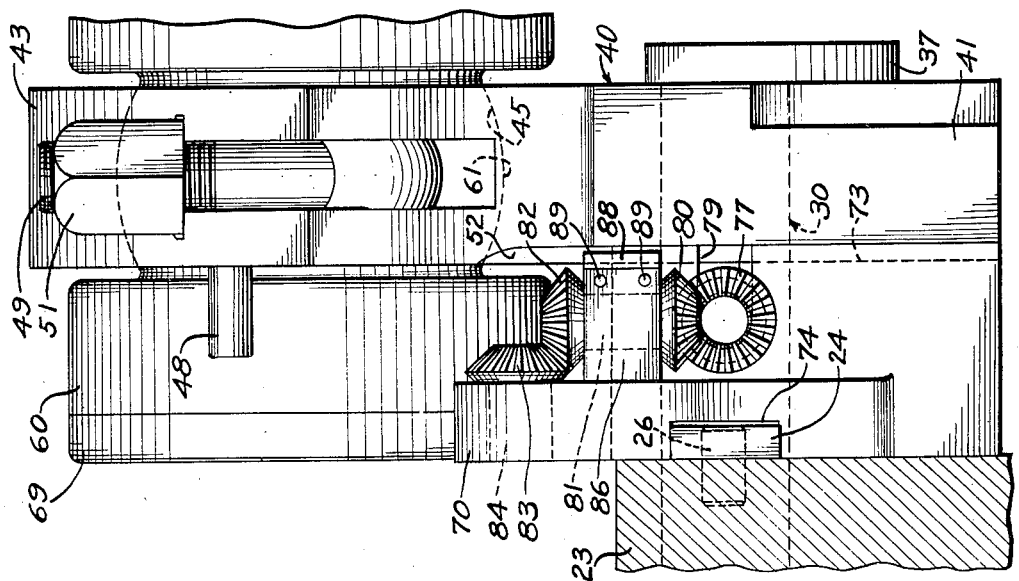

May 16, 1950     A. BRAUNWORTH     2,507,850
ADJUSTABLE BEARING SUPPORT
Filed Oct. 20, 1948     7 Sheets-Sheet 6

INVENTOR.
ALBERT BRAUNWORTH
BY
Campbell, Brumbaugh & Free
ATTORNEYS

May 16, 1950 — A. BRAUNWORTH — 2,507,850
ADJUSTABLE BEARING SUPPORT
Filed Oct. 20, 1948 — 7 Sheets-Sheet 7

INVENTOR.
ALBERT BRAUNWORTH
BY Campbell, Brumbaugh & Free
ATTORNEYS

Patented May 16, 1950

2,507,850

UNITED STATES PATENT OFFICE 2,507,850

ADJUSTABLE BEARING SUPPORT

Albert Braunworth, Stamford, Conn., assignor to Time, Incorporated, New York, N. Y., a corporation of New York Application October 20, 1948, Serial No. 55,444

8 Claims. (Cl. 308—60)

The present invention relates to an adjustable bearing support useful particularly in machines such as printing presses and the like wherein the relative positions of adjacent cylinder rolls is critical and requires delicate adjustment.

The invention consists essentially in mounting on the frame of a printing press or the like a stud member, a socket supporting member and a socket member adapted to be clamped or locked into fixed relation by the stud member, and a bearing housing preferably supported for limited universal movement in the socket member. The socket supporting member is movable laterally relative to the stud member and the socket member is movable vertically relative to the socket supporting member when the stud member is temporarily loosened. The socket supporting member and the socket member are movable laterally relative to the stud member by turning a lateral adjusting screw carried on the socket supporting member and engaged with the stud member. The socket member is movable vertically relative to the socket supporting member by turning a vertical adjusting screw carried on the socket supporting member and engaged with an element secured to or integral with the socket member. Gear systems are mounted in the socket supporting member for actuating the lateral and vertical adjusting screws.

One important advantage of the present invention is that it provides apparatus that makes it possible to adjust the spacing between the peripheries of adjacent rolls in a printing press or the like to extremely close tolerances.

Another advantage of the invention is that it provides a mechanism for adjusting the exact position of bearings from outside the frame and without requiring the adjusting personnel to clamber over or to reach inside the frame and be subjected to possible injury.

These and other advantages, as well as the utility of the invention, will become apparent from the detailed description that follows with reference to the accompanying figures of drawing wherein:

Figure 1 is a view in elevation of a complete assembly including two side frame members, an adjustable bearing support on each of said frame members and a roll mounted for rotation therebetween;

Figure 2 is a plan view of the assembly shown in Figure 1;

Figure 3 is a cross-sectional view taken along section line 3—3 of Figure 2;

Figure 4 is a view in elevation taken along section line 4—4 of Figure 1;

Figure 7 is a view in elevation of one end of an adjustable bearing support;

Figure 8 is a view in elevation of the other end of an adjustable bearing support;

Figure 13 is a schematic view illustrating the manner in which a roller supported in the assembly shown in Figure 11 may be adjusted relative to two adjacent rollers.

Figure 5:
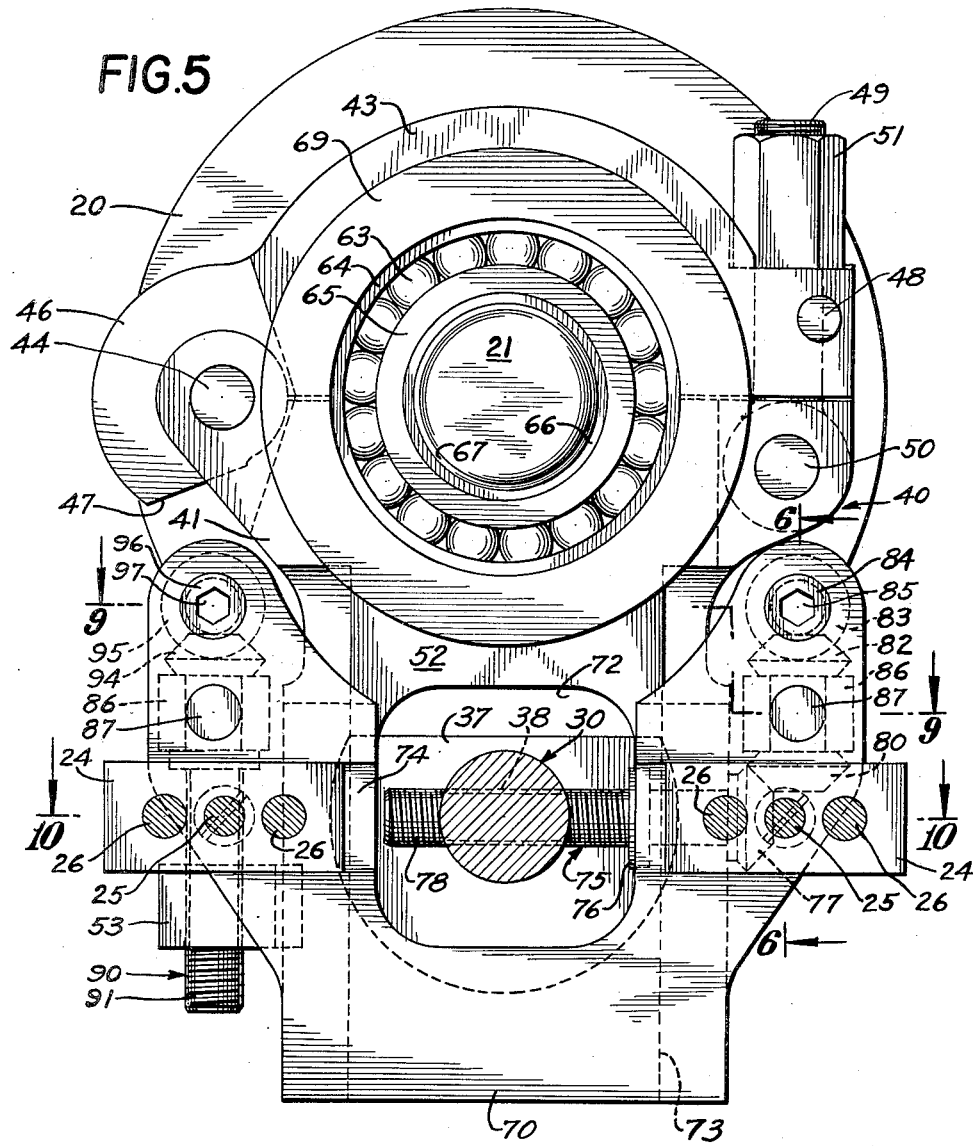
Figure 5 is a view in elevation taken along section line 5—5 of Figure 1.

It is to be understood that although in the following description the invention is described specifically as an adjustable bearing support for a distributor roll in a printing press, it is equally applicable to any bearing support that requires limited vertical and lateral adjustment.

Referring now to Figures 1 and 2 of the drawing, it will be seen that a roll 20 driven, if desired, through the medium of a gear system indicated generally at 22, is supported for rotation in bearing housings 60 mounted for limited universal movement in sockets 40, which in turn are supported by socket supporting members 70 mounted on side frame members 23 of a conventional printing press frame.

Referring now more particularly to Figure 3 of the drawing, there is shown a stud member 30 having an outer end 31 and an inner end 36. The outer end is slidable along its axis in the frame 23 and is provided with a threaded portion 32 bearing a thrust washer 33, a lock washer 34 and a lock nut 35. The inner end 36 of the stud member 30 extends through recesses 72 and 42 in the socket supporting member 70 and the base 41 of the socket member 40, respectively, and culminates in an enlarged head element 37 adapted to engage one side of the socket member 40. The stud member 30 is also provided with a threaded hole 38 transversely therethrough to accommodate a lateral adjusting screw 75 as will later be described.

As shown best in Figures 3 and 4, the socket member 40 includes a base portion 41 having a recess 42 and a cap 43 pivotally attached thereto by means of a pivot pin 44. The socket cap 43, when closed in the position shown in Figure 4, forms with the base 41 of socket member 40 a semi-spherical bearing surface 45 to allow limited universal movement therein of a bearing housing 60 likewise having a semi-spherical bearing surface 61, and a recess 62 at each end to accommodate ball bearings 63 having an outer race 64 in contact with the bearing housing 60, and an inner race 65 in contact with a sleeve 66 over the shaft 21 of the roll 20. The sleeve 66 is held in position on the shaft 21 by a retaining ring 67 and a sleeve locator pin 68. The ball bearing assemblies, including the balls 63 and inner and outer races 64 and 65, which may, if desired, be provided with built-in oil seals, are held in place by a pair of bearing caps 69 fixed to the bearing housing 60 in any suitable manner as by means of cap screws or the like.

The heel portion 46 of the socket cap 43 may be shaped as at 47 in such a manner that, when the cap 43 is lifted, it will remain open of its own weight so as to facilitate the removal or insertion of a bearing housing 60. By cutting away (or fitting) at 47, the cap is preferably made to stop in a substantially horizontal position when open, regardless of whether the socket is mounted in an upright or inclined position on the machine. Thus the cap may be used as a roller rest when the roller 20 is moved out of contact with the adjacent roller for the night. When the roller 20 is covered with rubber and the adjacent roller is of steel, this avoids developing a flat on the rubber while the machine is not in use, without having to disturb the adjustment of the socket. The other end of the socket cap 43 may be provided with a suitable handle 48, as shown in Figure 5, and is bifurcated to accommodate an eye bolt 49 pivoted on a pin 50 and locked in position to secure the cap 43 upon the base 41 of the socket member 40 by means of a suitable nut 51 or the like.

Figure 9:
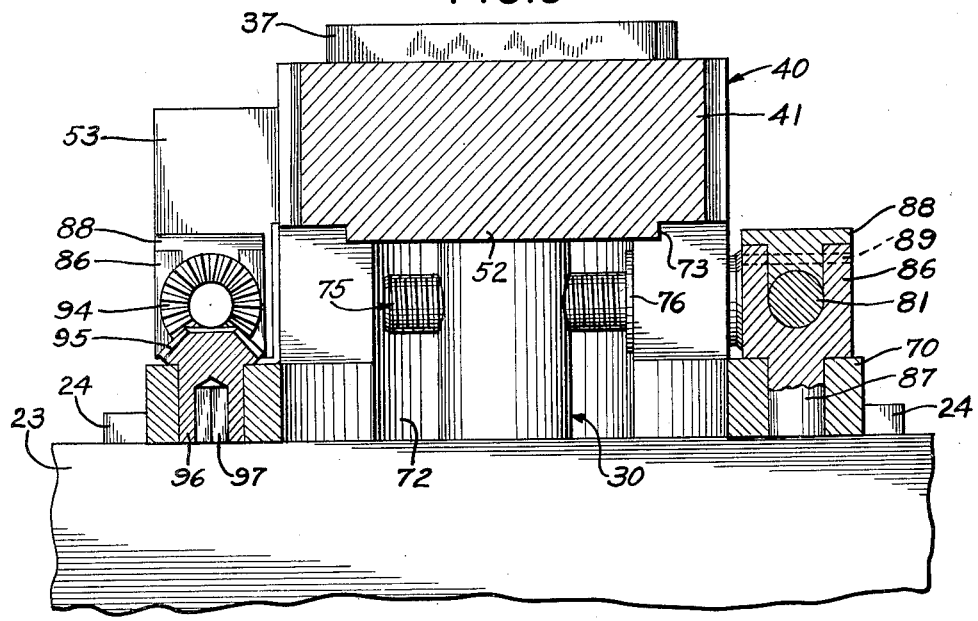
Figure 9 is a cross-sectional plan view taken along section line 9—9 of Figure 5.

The base 41 of the socket member 40 is preferably provided with a vertical key 52, as shown best in Figures 9 and 10, and with a socket adjusting block 53 secured thereto by means of a cap screw 54 or the like for engagement with a vertical adjusting screw 90, the operation of which will be described hereinafter. The recess 42 in the socket member 40 permits relative motion between the inner end 36 of the stud member 30 and the socket member.

Figure 6:
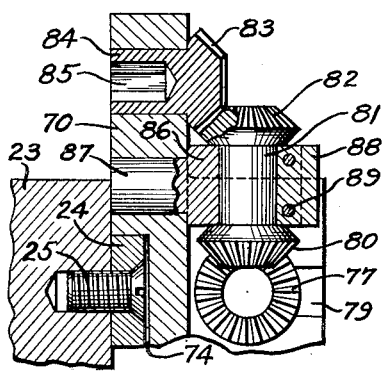
Figure 6 is a detailed view, taken along section line 6—6 of Figure 5, of a gear system for driving the lateral adjusting screw to effect a lateral adjustment of the socket supporting member relative to the stud member.
Figure 10:
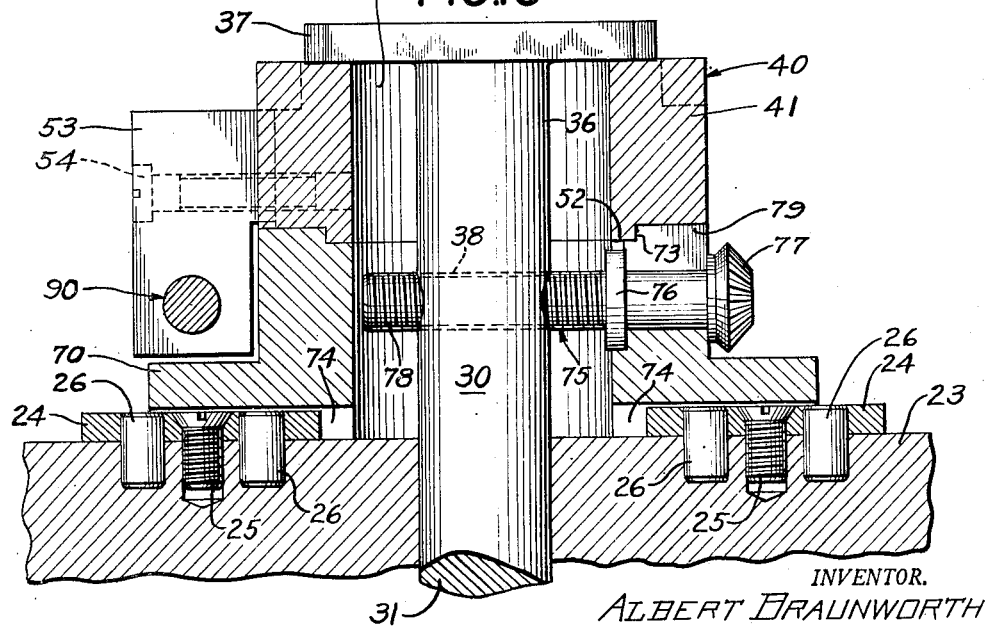
Figure 10 is a cross-sectional plan view taken along section line 10—10 of Figure 5.

Referring now to Figures 5, 7 and 10, the socket supporting member 70 is provided with keyways 74 designed to engage keys 24 secured to the frame 23 by means of cap screws 25 and held in the proper position by dowel pins 26. The socket supporting member 70 is provided with a recess 72 to permit relative movement between it and the inner end 36 of the stud member 30 and with a vertical keyway 73 to accommodate the key 52 of the socket member 40. A lateral adjusting screw 75, having a threaded portion 78 in engagement with the threaded hole 38 through the inner end 36 of the stud member 30, a collar 76 and a bevel or miter gear 77, is disposed horizontally on one end of the socket supporting member 70 in a slot 79 designed to permit relative transverse movement between the lateral adjusting screw 75 and the socket supporting member 70. The miter gear 77 of the lateral adjusting screw 75 meshes with a miter gear 80 mounted on a vertical shaft 81, the upper end of which is provided with a similar miter gear 82 meshing with a fourth miter gear 83, as shown best in Figure 6. The fourth miter gear 83 is disposed on a stub shaft 84 in the socket supporting member 70 and is provided with a hexagonal recess 85 or the like designed to receive what is commonly referred to as an Allen wrench.

The shaft 81 for the double miter gears 80 and 82 is supported for rotation relative to the socket supporting member 70 in a socket adjusting fork 86 having a stub shaft 87 driven into the body of the socket supporting member 70 and a socket adjusting fork cap 88 retained on the socket adjusting fork 86 by any suitable means such as bolts or pins 89.

Referring now to Figure 8, the other end of the socket supporting member 70 carries a vertical socket adjusting screw 90 in engagement with the socket adjusting block 53 secured to the socket member 40. This vertical adjusting screw 90, which consists of a threaded portion 91, a collar 92, a shaft 93, and a miter gear 94, is supported in a second socket adjusting fork 86 and cap 88 in a manner similar to that described with reference to the support for shaft 81 of miter gears 80 and 82. The miter gear 94 of the vertical adjusting screw 90 meshes with a second miter gear 95 having a stub shaft 96 that is, like the stub shaft 84 of miter gear 83, provided with a recess 97 adapted to be engaged by any suitable tool such as an Allen wrench 27 shown in phantom in Figures 1 and 2.

Figure 11:
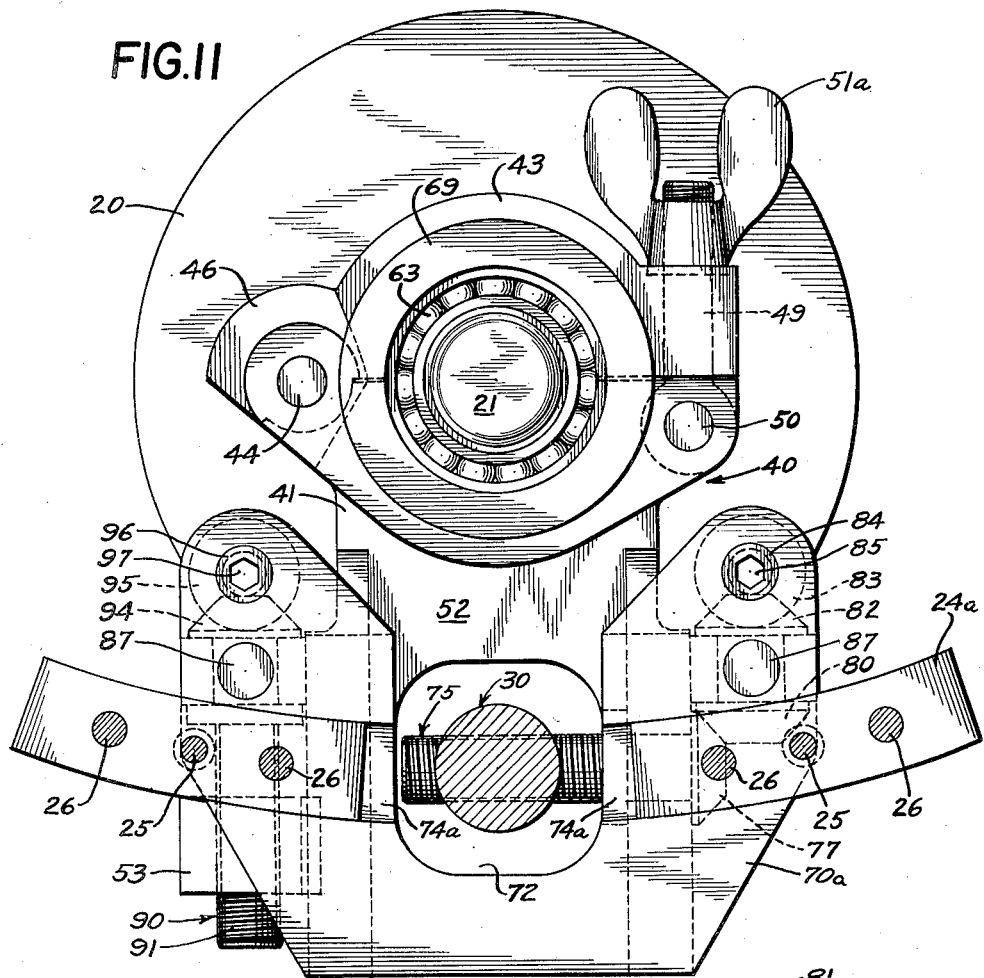
Figure 11 is a view in elevation similar to that of Figure 5 but showing an alternative embodiment of the invention.

As illustrated in Figure 11, the keys 24a attached to the frame 23, and the keyways 74a in the socket supporting member 70a may, if desired, be curved without otherwise altering the construction of the various parts. It is also quite obvious that a wing nut 51a may be substituted for the hexagonal nut 51 shown in Figures 4 and 5, to fasten the socket cap 43 to the base 41 of the socket member 40.

Figure 12:
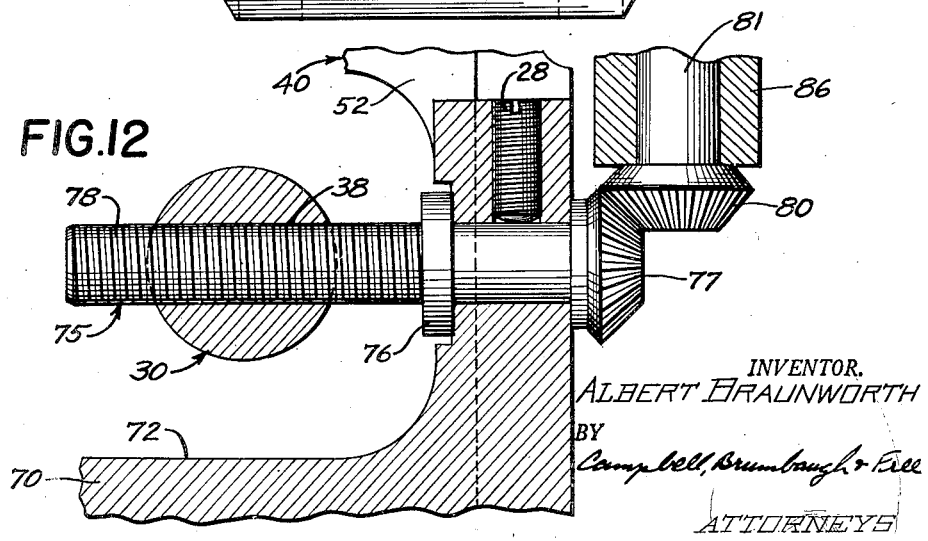
Figure 12 is a detailed sectional view showing an alternative device for locking the lateral adjustment means on the socket support member.

It is also to be understood that it is within the scope of the present invention to provide a locking set screw 28 for the lateral socket adjusting screw 75 substantially as shown in Figure 12 of the drawing.

In operation, the position of the shaft 21 may be changed by releasing the tension on the stud member 30, moving the socket supporting member 70 and the socket member 40 laterally relative to the stud member 30, and then moving the socket member 40 vertically relative to the socket supporting member 70 until the shaft 21 is placed in the desired position. The tension on the stud member 30 is relieved by loosening the lock nut 35 by means of any suitable wrench. This relieves the pressure of the enlarged head 37 against the socket member 40, of the socket member against the socket supporting member 70, and of the socket supporting member against the side of the frame 23. This relief of pressure brings about a slight relative movement of the various members in a direction along the longitudinal axis of the stud member 30. The lateral adjusting screw 75, which is in engagement with the stud member 30, is seated in the slot 79 of the socket supporting member 70 for limited motion relative thereto. It thus follows that when the stud member 30 has been loosened, the socket supporting member 70 and the socket member 40 can be adjusted in a lateral direction by engaging the recess 85 in the stub shaft 84 of the miter gear 83 with an Allen wrench 27, or the like and turning it so as to turn the lateral adjusting screw 75.

Vertical movement of the socket member 40 relative to the socket supporting member 70 is effected by engaging the recess 97 in the stub shaft 96 of the miter gear 95 with an Allen wrench 27, or the like, to bring the gear 95 into engagement with the miter gear 94 of the vertical adjusting screw 90. There is sufficient play between the vertical adjusting screw 90 and the socket adjusting block 53 to permit a slight increase in distance, due to the decrease in pressure, between the socket supporting member 70 and the socket member 40 occasioned by the temporary release of the stud member 30. The turning of the vertical adjusting screw 90 effects the raising or lowering of the socket member 40 by virtue of its engagement with the socket adjusting block 53 affixed to the base 41 of the socket member 40.

If it is desired to insert, remove or replace a bearing housing 60 in the socket member 40, the nut 51 or 51a of the eye bolt 49 is loosened and the socket cap 43 is lifted by grasping handle 48 until it rests in the desired open position by virtue of the abutment of heel portion 47 against the base 41 of the socket member 40. The assembly comprising the shaft 21 of the roll 20, the sleeve 66, the ball bearings 63, 64, 65 and the bearing housing 60, as well as bearing caps 69, is then placed into the socket member 40 and the socket cap 43 is closed thereover and locked into position by tightening nut 51 or 51a on the eye bolt 49.

The modification shown in Figure 11 has the advantage, peculiar to it, of permitting adjustment of the roller 20 relative to two adjacent rollers. Referring to the schematic illustration in Figure 13, the position of roller 20 relative to the adjacent roller A can be adjusted by the operation of vertical adjusting screw 90 in the manner previously described. The roller 20 may then be adjusted relative to roller B by the operation of lateral adjusting screw 75, whereby the adjustment between rollers 20 and A will remain unchanged when the keyways 74a have a radius of curvature equal to radius R.

It is to be understood that numerous modifications and alterations of the structure specifically disclosed will immediately suggest themselves to those skilled in the art upon reading the foregoing description. All such modifications and alterations are intended to come within the scope of the present invention as defined in the appended claims.

I claim:

1. A mechanism comprising a frame, a stud member releasably secured to the frame against lateral and vertical displacement, a socket supporting member keyed to the frame and movable laterally relative to the stud member, a lateral adjusting screw mounted for rotation on the socket supporting member and in threaded engagement with the stud member for moving the socket supporting member relative to the stud member, a socket member keyed to and movable vertically relative to the socket supporting member, a vertical adjusting screw mounted for rotation on the socket supporting member and in threaded engagement with an element of the socket member for moving the socket member relative to the socket supporting member, means on the stud member for releasably clamping the socket member to the socket supporting member and the socket supporting member to the frame to lock said members in fixed relation relative to the stud member, gear means on the socket supporting member engageable with the lateral adjusting screw to rotate it to move the socket supporting member laterally relative to the stud member, means for supporting said lateral adjusting screw for limited transverse movement relative to the socket supporting member to allow longitudinal movement of the stud member relative to the socket supporting member, second gear means on the socket supporting member engageable with the vertical adjusting screw to rotate it for vertical movement of the socket member relative to the socket supporting member, and a bearing housing mounted for limited universal movement within said socket member.

2. An adjustable bearing support adapted to be fixed to a frame member comprising a stud member, a socket supporting member movable laterally relative to the stud member, a lateral adjusting screw mounted for rotation on the socket supporting member and in threaded engagement with the stud member for moving the socket supporting member relative to the stud member, a socket member mounted on and movable vertically relative to the socket supporting member, a vertical adjusting screw mounted for rotation on the socket supporting member and in threaded engagement with the socket member for moving the socket member relative to the socket supporting member, means on the stud member for releasably clamping the socket member to the socket supporting member and the socket supporting member to the frame to lock said members in fixed relation relative to the stud member, gear means on the socket supporting member engageable with the lateral adjusting screw to rotate it to move the socket supporting member laterally relative to the stud member, means for supporting said lateral adjusting screw for limited transverse movement relative to the socket supporting member to allow longitudinal movement of the stud member relative to the socket supporting member, second gear means on the socket supporting member engageable with the vertical adjusting screw to rotate it for vertical movement of the socket member relative to the socket supporting member, and a bearing housing mounted for limited universal movement within said socket member.

3. An adjustable bearing support comprising a stud member, a socket supporting member movable laterally relative to the stud member, a lateral adjusting screw mounted for rotation on the socket supporting member and in threaded engagement with the stud member for moving the socket supporting member relative to the stud member, a socket member mounted on and movable vertically relative to the socket supporting member, a vertical adjusting screw mounted for rotation on the socket supporting member and in threaded engagement with the socket member for moving the socket member relative to the socket supporting member, means on the stud member for releasably clamping the socket member, the socket supporting member and the stud member together to lock said members in fixed relation, gear means on the socket supporting member engageable with the lateral adjusting screw to rotate it to move the socket supporting member laterally relative to the stud member, means for supporting said lateral adjusting screw for limited transverse movement relative to the socket supporting member to allow longitudinal movement of the stud member relative to the socket supporting member, second gear means on the socket supporting member engageable with the vertical adjusting screw to rotate it for vertical movement of the socket member relative to the socket supporting member, and a bearing member mounted within said socket member.

4. An adjustable bearing support adapted to be fixed to a frame member comprising a stud member, a socket supporting member movable laterally relative to the stud member, a lateral adjusting screw on the socket supporting member and in engagement with the stud member for moving the socket supporting member relative to the stud member, a socket member for supporting a bearing, said socket member being mounted on and movable vertically relative to the socket supporting member, a vertical adjusting screw on the socket supporting member and in engagement with the socket member for moving the socket member relative to the socket supporting member, means on the stud member for releasably clamping the socket member to the socket supporting member and the socket supporting member to the frame to lock said members in fixed relation relative to the stud member, means on the socket supporting member engageable with the lateral adjusting screw to rotate it to move the socket supporting member laterally relative to the stud member, means for supporting said lateral adjusting screw for limited transverse movement relative to the socket supporting member to allow longitudinal movement of the stud member relative to the socket supporting member, and means on the socket supporting member engageable with the vertical adjusting screw to rotate it for vertical movement of the socket member relative to the socket supporting member.

5. An adjustable bearing support adapted to be fixed to a frame member comprising a stud member, a socket supporting member movable laterally relative to said stud member, means for moving the socket supporting member laterally relative to the stud member, a socket member for supporting a bearing, said socket member being mounted on and movable at an angle to but in the same plane as the direction of relative movement of the socket supporting member, means for moving the socket member relative to the socket supporting member, and means for releasably clamping the socket member to the socket supporting member and the socket supporting member to the frame to lock said members in fixed relation relative to the stud member.

6. An adjustable bearing support adapted to be secured to a stud member fixed to a frame comprising a socket supporting member movable laterally relative to said stud member, means for moving the socket supporting member relative to the stud member, a socket member for supporting a bearing, said socket member being mounted on and movable relative to the socket supporting member, means for moving the socket member at an angle to but in the same plane as the direction of relative movement of the socket supporting member, and means for releasably clamping the socket member to the socket supporting member and the socket supporting member to the frame to lock said members in fixed relation relative to the frame.

7. An adjustable bearing support adapted to be secured to a stud member fixed to a frame comprising a socket supporting member movable relative to the stud member, means on the socket supporting member for moving the socket supporting member relative to the stud member, a socket member for supporting a bearing, said socket member being mounted on the socket supporting member, and means on the stud member for releasably clamping the socket supporting member to the frame to lock said member in fixed relation relative to the stud member.

8. An adjustable bearing support adapted to be secured to a stud member fixed to a frame comprising a socket supporting member mounted on the stud member, a socket member for supporting a bearing, said socket member being mounted on and movable relative to the socket supporting member, means for moving the socket member relative to the socket supporting member, and means on the stud member for releasably clamping the socket member to the socket supporting member to lock said members in fixed relation relative to the stud member.

ALBERT BRAUNWORTH.

REFERENCES CITED

The following references are of record in the file of this patent:

UNITED STATES PATENTS

| Number | Name | Date |
|---|---|---|
| 913,119 | Ford | Feb. 23, 1909 |
| 1,107,843 | Robertson | Aug. 18, 1914 |